United States Patent Office 3,010,323
Patented Nov. 28, 1961

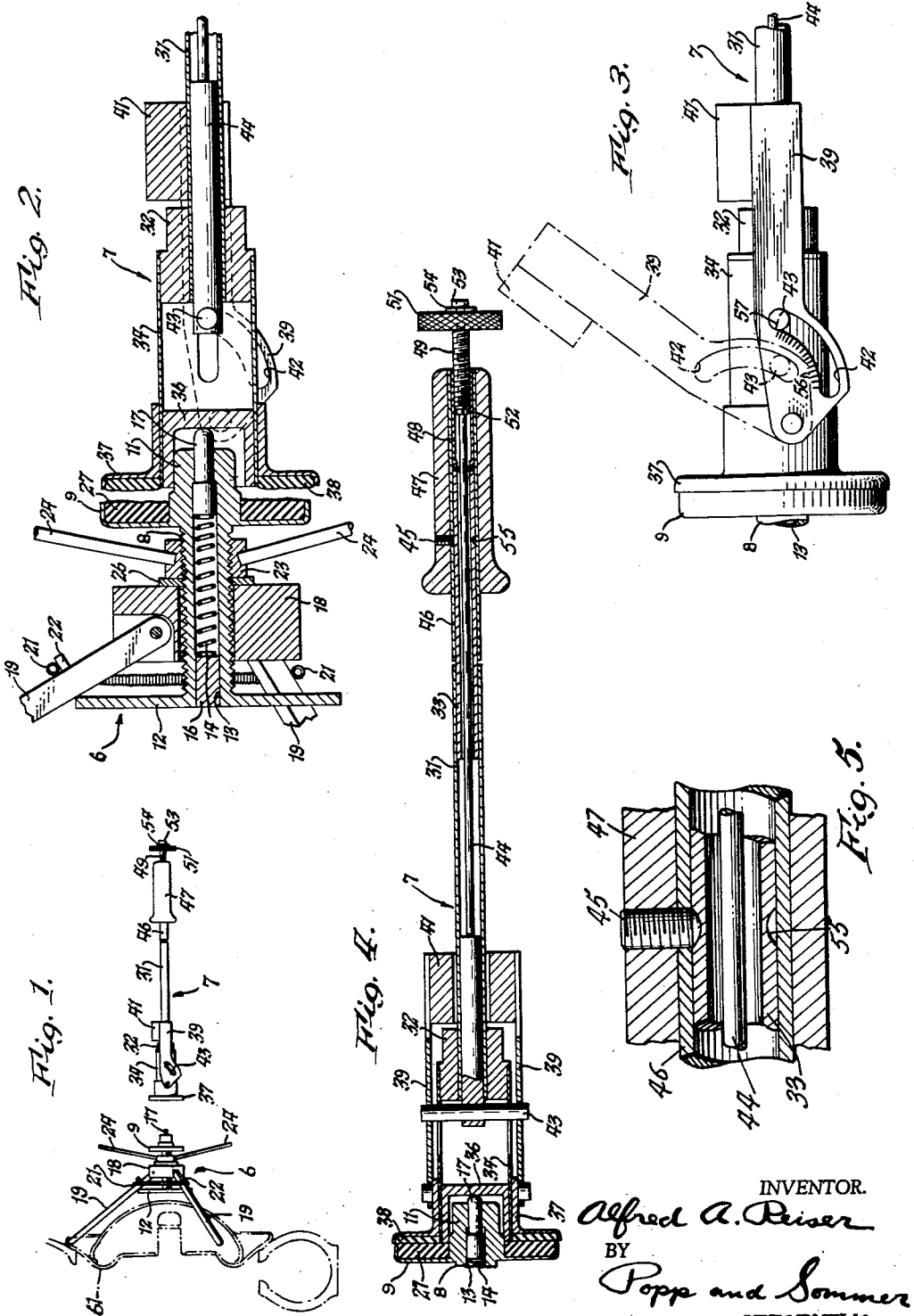

3,010,323
MECHANISM FOR BALANCING A
ROTATABLE BODY
Alfred A. Reiser, R.F.D. 1, Old Lake Shore Road,
Lake View, N.Y.
Filed Aug. 28, 1957, Ser. No. 680,823
5 Claims. (Cl. 73—458)

This invention relates to a mechanism for balancing rotatable bodies, and more particularly a mechanism for balancing vehicle wheels.

This invention represents an improvement over the mechanism disclosed in Patent 2,739,482, granted March 27, 1956, of which I am a co-inventor.

Unbalance wheels, particularly front wheels of motor vehicles, are undesirable because they cause intense vibration at certain speeds, which vibrations accelerate wear and tear on the vehicle, and an uneven wearing of the tires. It has become common practice to balance vehicle wheels by adding weights to the wheel rim at a point opposite an overweighted side, and various machines or tools have been proposed and utilized for such counterbalancing operations, which machines or tools have been used with varying degrees of success.

The balancing mechanism of the present invention represents an improvement which is characterized by extreme simplicity of structure and use, and which is free from delicate parts so that the mechanism will stand up under conditions of severe and constant use while providing satisfactory results.

The mechanism of the invention will permit fast and accurate balancing of a vehicle wheel by anyone of limited experience, and without demounting the wheel from the vehicle, and without removal of the hub cap or other decorative trim from the wheel. In addition, the balancing mechanism of the invention may be easily and accurately positioned upon the wheel to be balanced, and will automatically be centered relative to the axis of the wheel axle.

The main object of this invention is to provide a mechanism for balancing a rotatable part, which mechanism will indicate the additional weight and location thereof as required to balance the rotatable part.

A more specific object of this invention is to provide a mechanism for balancing a vehicle wheel assembly without the necessity of removing the wheel assembly from the vehicle, or removal of the hub cap or other decorative trim from the wheel assembly.

A further object of this invention is to provide a wheel balancing mechanism which may be easily and accurately mounted upon the wheel to be balanced and which will be automatically centered relative to the wheel axle.

A further object of this invention is to provide a balancing mechanism in which the number of adjustable controls is held to a very minimum.

Still another object of the invention is to provide a wheel balancing mechanism which is of low cost, which is free from delicate parts, and which will provide long and satisfactory use.

These and further objects and features of the invention will become more apparent from the following description and the accompanying drawing wherein:

FIG. 1 is a view illustrating a balancing mechanism of the invention as applied to a vehicle wheel preparatory to a wheel balancing operation;

FIG. 2 is an enlarged section view of a part of the mechanism illustrated in FIG. 1;

FIG. 3 is an enlarged partial view of the mechanism of FIG. 1;

FIG. 4 is an enlarged section view of the mechanism of FIG. 1; and

FIG. 5 is a fragmentary view similar to FIG. 4 on an enlarged scale.

Referring now to the drawing, and as best seen in FIG. 1, a wheel balancing mechanism embodying the principles of the invention, consists of two major assemblies, numeral 6 identifying a spider section or wheel attachment assemblage, and numeral 7 identifying a separate hand supported tool or indicator assemblage. In a wheel balancing operation, which will be described in greater detail hereinafter, the assemblage 6 is affixed for rotation with the wheel being tested for balance, while the indicator assemblage 7 is manually held in engagement with the wheel attachment assemblage.

The wheel attachment assemblage 6 includes a threaded shaft 8 having a clutch disc 9 and axial hub 11 at one end, and an expansison disc 12, at the opposite end. The threaded shaft has a longitudinal bore 13 in which is compressively arranged a helical spring 14, one end of the spring abutting a plug 16, the opposite end abutting a pin 17 which is arranged for limited axial projection beyond the end of the hub 11. A hub piece 18 is arranged for longitudinal movement upon the shaft 8, said hub piece pivotally supporting three equi-spaced fingers or leg members 19 which are arranged to contact the edge of the expansion disc 12. A garter spring 21 is arranged to compressively embrace the leg members 19, said spring engaging a pin 22 provided in each leg member, whereby the leg members are urged at all times in firm engagement with the edge of the expansion disc 12. A nut 23, having a pair of radially disposed levers or arms 24, is threadably mounted upon the shaft 8 and abuts at one end a thrust washer 26 which engages the side of the hub piece 18. It will be seen that radial movement of the leg members 19 will be accomplished by rotation of the nut 23 to axially position the hub piece 18 upon the threaded shaft 8. The clutch disc 9 encloses a pad of friction material 27, which preferably is formed of a rubber-like composition, or equivalent material.

The parts of the wheel attachment assemblage as above described are symetrically arranged so that dynamic unbalance is avoided during rotation of the wheel attachment assemblage 6.

The indicator assemblage 7 includes a tubular shaft 31, having a hub piece 32 secured to one end, the other end of the shaft being fixed to a stub shaft 33. A tubular housing 34 is secured to the hub piece 32 at one end, which tubular housing is fixed to supports internally at the other end a cup-shaped member 36, and externally supports at said other end a flanged member 37, which is arranged to enclose a pad of friction material 38, which preferably is formed of a rubber-like composition. The inner diameter of the cup-shaped member 36 is larger than the diameter of a major portion of the axial hub 11, but is only slightly larger than the diameter of the hub 11 at the base thereof. By such an arrangement the assemblage 7 is loosely supported on the hub 11 when the faces of the pads 27 and 38 are out of engagement, and snugly supported on the hub 11 when the faces of the pads 27 and 38 are out of engagement, and snugly supported on the hub 11 when the faces of the pads are in engagement. Pivotally secured to the sides of member 37 are a pair of levers 39, the free ends of which support a weight 41, which is grooved on one side to embrace the tubular shaft 31. The pivoted levers each have an arcuate cam slot 42 for receipt of a cross-pin member 43 mounted upon the end of an extension rod 44 which is slidably maintained within the tubular shaft 31. It will be seen that axial movement of the extension rod 44 will cause sliding engagement between the ends of the cross-pin 43 and the arcuate cam slots 42 so that pivoted movement of the levers 39 is effected. In such manner, the weight 41 is positionable at varying radial distances from the axis of the tubular shaft 31, to provide various degrees of dynamic unbalance as the indicator assemblage is rotated.

Stub shaft 33 is journaled within a bearing tube 46 the latter of which has secured thereto a handle 47 by means of a screw 45. The inner end of this screw preferably enters an annular groove 55 in the stub shaft 33 to prevent the handle 47 and bearing tube 46 from sliding lengthwise on the stub shaft 33. The outer end of the bearing tube 46 encloses a sleeve member 48 which is fixed therein and is internally threaded for engagement with a threaded shaft 49 of an adjustment knob 51. The threaded shaft 49 rotatably supports the end of the extension rod 44, the latter of which is affixed against longitudinal movement relative to the threaded shaft 49 by means of a thrust collar 52 affixed to the extension rod 44, and a nut 53 which bears against a washer 54 located adjacent to the side of the adjustment knob 51. It will be seen that by rotation of the adjustment knob 51, longitudinal movement is given to the extension rod 44 to cause arcuate movement of the pivoted levers 39 by virtue of its own cam action and the centrifugal force of the weight as limited by the pin 43 and arcuate cam slot 42 relationship.

In other words, by rotating the adjustment knob 51, the position of the weight 41 relative to the axis of the shaft 31, may be changed to produce variations in the dynamic unbalance afforded by the indicator assemblage 7, and this can be done by the cam pin 43 when the tool is stationary, but this action is augmented by the centrifugal force of the weight 41 when in use. A series of graduations or indicia 56, is inscribed along one edge of a radial slot 42, while a marker line 57 is provided on the end of the cross-pin 43. The indicia 56 may be calibrated to indicate the amount of weight to be affixed to a vehicle wheel to achieve dynamic balance of the wheel as determined by use of the mechanism of the invention. The indicia 56, while actually measuring the arcuate positioning of the levers 39 relative to the axis of the shaft 31, represent a function of the dynamic unbalance provided by the radial positioning of the weight 41, hence the indicia 56 may be arranged to give a direct indication of the required weight to balance a vehicle wheel, all of which will be apparent after an understanding of the operation of the mechanism of the invention which will now be given.

Assuming that a front wheel 61 of a motor vehicle is to be tested for balance, the car is jacked up so that the wheel will rotate freely, and a drive mechanism (not shown), is arranged for rotating the wheel at a speed of say, 1200 r.p.m. The drive unit, which forms no part of the present invention, is provided with convenient controls for starting, stopping and braking the wheel 61, and for rotating it at the assumed 1200 r.p.m. The wheel attachment assemblage 6 is positioned so that the free end of the leg members 19 engage the wheel rim, and the nut 23 is rotated by means of the arms 24 to spread the legs radially in firm engagement with the rim of the wheel. In such manner the assemblage 6 is securely affixed to the wheel for rotation therewith. The wheel 61 is then rotated and if it is in good balance, there will be no evidence of vibration of parts of the vehicle, such as a fender or bumper (not shown). However, if the wheel is not in good balance, vibration of such parts of the vehicle will be noted. If such is the case, the indicator assemblage 7 is moved axially so that the cup-shaped member 36 will be moved onto the axial hub 11 and the faces of the pads 27 and 38 will be engaged. Movement of the rotatable parts of the assembly 7 will thus take place. It may be mentioned that initially the weight 49 will be set in close proximity to the axis of the shaft 33 so that dynamic unbalance of the assemblage 7 will be at a minimum. Once the speed of rotation of indicator assemblage 7 is the same as that of the wheel attachment assemblage 6, the indicator assemblage is moved axially away from assemblage 6 so that the cup-shaped member 36 will be supported upon the reduced diameter of axial hub 11, with the pin 17 engaging with slight pressure against the inner surface of the cup-shaped member 36.

In such relative position the speed of rotation of the indicator assemblage 7 will be somewhat less than that of the wheel attachment assemblage 6 due to the retrogression of the cup-shaped member 36 about the hub 11. This retrogression is caused by the firm tangential contact of member 36 with the hub 11 resulting from the centrifugal force of the weight 41. The adjustment knob 51 is then slowly rotated to provide increased dynamic unbalance of the indicator assemblage 7 by reason of the weight 41 being moved radially away from the axis of rotation of shaft 31. Such dynamic unbalance will tend to increase the intensity of vibration when it acts in conjunction with the unbalanced weight of the wheel 61, and will decrease the intensity of vibration when it acts in opposition thereto. By adjustment of the radial position of the weight 41, a point will be reached at which the dynamic unbalance of the assemblage 7 will be equal and opposite to the unbalance of the wheel 61. In other words, since the weight 41 rotates at a slower speed than the attachment assemblage 6 (due to the relative size of the mating cylindrical surfaces of the parts 36 and 11) the weight 41 scans the wheel, moving from a position in phase with the unbalance where it adds to the unbalance, to a position 180° out of phase where it has the maximum counterbalancing effect, and by adjusting the value of the weight at this last position, the unbalanced wheel can be exactly counterbalanced by the weight. When this occurs there will be no vibration of parts of the vehicle, such as bumper, fenders, etc., however, a condition of maximum vibration will exist when the dynamic unbalance of assemblage 7 is in a position as to supplement the dynamic unbalance of the wheel. In other words, when the effective unbalanced weight of assemblage 7 is directly opposite the weight causing unbalancing of the wheel 61, there will be no apparent vibration as the wheel rotates, while when the effective weight of assemblage 7 is 180° removed therefrom, or at the same peripheral location as the weight causing wheel unbalancing, the intensity of vibration will be at a maximum.

When the above condition of minimum vibration is attained, the indicator assemblage is quickly moved axially so that the face of pad 38 engages the face of pad 27. In such position the wheel will rotate without causing any apparent vibration of the parts of the vehicle. The wheel is then stopped and the peripheral location of the weight to be added to the wheel will be indicated, which position will be in direct alignment with the centerline projection of the weight 41 on the side of the shaft 31 at which the weight reposes; and the weight to be added will be indicated by observing the graduation of the indicia 56, opposite the line 57.

From the foregoing disclosure it will be seen that a determination of the weight and location thereof required for wheel balancing may be performed very quickly and accurately with very little practice, and that the objectives set forth in the beginning of this disclosure may be easily realized by a mechanism embodying the principles of the invention.

It will be seen that the arrangement of the cup-shaped member 36 and the reduced diameter of the axial hub 11 serves as a coupling means adapted for arrangement in telescoping manner whereby a centrifugally induced tangential contact may be established between the rotatable parts, i.e., the cup-shaped member 36 and the axial hub 11. Since the circumferential length of the cup-shaped member is different than the circumferential length of the axial hub, a difference in speed of rotation between the cup-shaped member and the axial hub will be realized.

The foregoing description has been given in detail without thought of limitation since the inventive principles involved are capable of assuming other physical embodiments without departing from the spirit of the invention and the scope of the appended claims.

What is claimed is:

1. A mechanism for balancing a vehicle wheel comprising a wheel attachment assemblage, and a separate hand supported indicator and balancing assemblage having a manually operable clutch means for coupling the hands supported indicator and balancing assemblage to the wheel attachment assemblage for rotation therewith at the same speed and at a different speed selectively, said wheel attachment assemblage having means for coupling the wheel attachment assemblage to the wheel, said hand supported indicator and balancing assemblage having a tubular shaft affixed at one end to a shaft hub piece, a longitudinally movable extension rod within the tubular shaft and projecting beyond the end of the shaft hub piece, a tubular housing affixed to the shaft hub piece, at least one lever pivotally affixed at one end to the tubular housing and having a weight, which is movable toward and from the axis of rotation of said hand supported indicator and balancing assemblage, affixed to the free end of said lever, said lever having an arcuate cam slot arranged transversely of the lever, a cross pin fixed to the end of the extension rod and projecting transversely into said cam slot, means arranged to move the extension rod axially relative to said tubular shaft to move said pin along said cam slot and vary the radial distance of the weight from the center of rotation of the tubular shaft, and a handle journalled on the tubular shaft.

2. A mechanism for balancing a rotatable body comprising an attachment assemblage, a separate hand supported indicator and balancing assemblage, means for coupling the attachment assemblage to the rotatable body for rotation therewith, said hand supported indicator and balancing assemblage having a manually operable clutch means for coupling the hand supported indicator and balancing assemblage to said attachment assemblage for rotation therewith at the same speed and said hand supported indicator and balancing assemblage also having a cylindrical surface for being rotatably driven by a mating cylindrical surface of the attachment assemblage at a speed different from that of the attachment assemblage through a centrifugally induced tangential contact between the said cylindrical surfaces of said attachment assemblage and the hand supported indicator and balancing assemblage, an eccentric weight mounted on said hand supported indicator and balancing assemblage, and manually adjustable means for selectively positioning said weight at various distances from the center of rotation of said hand supported indicator and balancing assemblage.

3. A mechanism for balancing a rotatable body comprising an attachment assemblage and a separate hand supported indicator and balancing assemblage, means for coupling the attachment assemblage to the rotatable body for rotation therewith about an axis, said attachment assemblage having a manually operable clutch means for coupling the hand supported indicator and balancing assemblage for rotation therewith at the same speed and the attachment assemblage also having a substantially coaxial driving part fixed to rotate with said attachment assemblage and provided with a coaxial cylindrical drive surface, said hand supported indicator and balancing assemblage having a driven part fixed to rotate with said hand supported indicator and balancing assemblage and provided with a coaxial cylindrical driven surface mating with said driving surface and transmitting motion from said driving to said driven part, one of said cylindrical surfaces being of greater circumferential extent than the other cylindrical surface thereby to effect a differential in the rate of rotation of said assemblages, an eccentric weight mounted on said hand supported indicator and balancing assemblage, and means for manually selectively positioning said weight at various distances from the center of rotation of said hand supported indicator and balancing assemblage.

4. A mechanism for balancing a rotatable body comprising an attachment assemblage, a separate hand supported indicator and balancing assemblage, means for coupling the attachment assemblage to the rotatable body for rotation therewith, said attachment assemblage and said hand supported indicator and balancing assemblage having a manually operable clutch means for coupling the hand supported indicator and balancing assemblage to said attachment assemblage for rotation therewith at the same speed and said hand supported indicator and balancing assemblage also having a coupling means for rotary interconnection of the attachment assemblage and the hand supported indicator and balancing assemblage, said coupling means including telescoping members having radially engageable cylindrical surfaces of unequal circumferential length, an eccentric weight mounted on said hand supported indicator and balancing assemblage, and means for positioning said weight at various distances from the center of rotation of said hand supported indicator and balancing assemblage.

5. A mechanism for balancing a rotatable body, comprising an attachment assemblage, means for coupling the attachment assemblage to said rotatable body for rotation coaxially therewith, said attachment assemblage also having, on its side remote from said body, a friction clutch face and a cylindrical driving surface, and a totally separate hand supported indicator and balancing assemblage having a friction clutch face engageable with said first clutch face to effect rotation of said assemblages at the same speed, and having a cylindrical driven face of different diameter than and engageable with said cylindrical driving surface to rotate said hand supported indicator and balancing assemblage through power derived from and at a speed different from said attachment assemblage, said hand supported indicator and balancing assemblage including a weight and means for manually positioning said weight at different radial distances from one side of the axis of rotation of said hand supported indicator and balancing assemblage.

References Cited in the file of this patent

UNITED STATES PATENTS

| | | |
|---|---|---|
| 2,277,190 | Weaver | Mar. 24, 1942 |
| 2,372,891 | Fenton | Apr. 3, 1945 |
| 2,662,396 | Hunter | Dec. 15, 1953 |
| 2,675,200 | Wohlforth | Apr. 13, 1954 |
| 2,731,833 | Jones | Jan. 24, 1956 |
| 2,739,482 | Reiser et al. | Mar. 27, 1956 |